(12) United States Patent
Olderdissen (10) Patent No.: US 8,006,253 B2
(45) Date of Patent: Aug. 23, 2011

(54) VERSION-ADAPTIVE SERIALIZATION AND DESERIALIZATION

(75) Inventor: Jan Ra Olderdissen, Newbury Park, CA (US)

(73) Assignee: IXIA, Calabasas, CA (US)

( * ) Notice: Subject to any disclaimer, the term of this patent is extended or adjusted under 35 U.S.C. 154(b) by 1027 days.

(21) Appl. No.: 11/847,713

(22) Filed: Aug. 30, 2007

(65) Prior Publication Data

US 2009/0064206 A1    Mar. 5, 2009

(51) Int. Cl.
*G06F 9/54* (2006.01)
*G06F 9/44* (2006.01)
(52) U.S. Cl. ................................. 719/330; 717/108
(58) Field of Classification Search .............. 719/330
See application file for complete search history.

(56) References Cited

U.S. PATENT DOCUMENTS

| | | | |
|---|---|---|---|
| 6,233,730 B1 | 5/2001 | Todd et al. | |
| 6,298,353 B1 * | 10/2001 | Apte | 1/1 |
| 6,438,559 B1 | 8/2002 | White et al. | |
| 6,477,701 B1 * | 11/2002 | Heistermann et al. | 717/108 |
| 6,906,646 B1 * | 6/2005 | Mills et al. | 341/101 |
| 6,928,488 B1 | 8/2005 | de Jong et al. | |
| 7,020,666 B2 | 3/2006 | Doise et al. | |

* cited by examiner

*Primary Examiner* — Andy Ho
*Assistant Examiner* — Abdou Seye
(74) *Attorney, Agent, or Firm* — SoCal IP Law Group LLP; Steven C. Sereboff; John E. Gunther (57) ABSTRACT

Methods for serializing and deserializing a program object are disclosed. Serialized data may be generated to convey a representation of the program object. The serialized data may include data identifying a class for the program object, and a data type and at least one data value for each data member comprising the program object. The program object may be reconstructed from the serialized data according to a definition of the identified class. A received data member may be reconstructed if the received data type is an expected data type according to the class definition. A received data member may be ignored if the expected data type according to the class definition is a null data type. Default data may be substituted for a received null data member if the expected data type according to the class definition is not a null data type. The received data type may be converted to an expected data type according to the class definition.

15 Claims, 10 Drawing Sheets

Allowed Data Type Conversions

| Old Data Type | New Data Type | Notes |
|---|---|---|
| Integer (any length) | Integer (any length) | Deserializer may throw an error if the data in the serial stream overflows the length of the data member in the class. |
| Integer (any length) | Double | |
| Integer (any length) | Boolean | Deserializer may throw an error if the data in the serial stream is other than 0 or 1. |
| Double | Integer (any length) | Deserializer may throw an error if the data in the serial stream overflows the length of the data member in the class. |
| All | Null | Deserializer may substitute default data for the null data member. |
| String | Integer (any length) | Deserializer may throw an error if the data in the serial stream overflows the length of the data member in the class. |
| Integer (any length) | String | |

| Serializer version | Deserializer version | Serialized data type | Expected data type | Deserializer action |
|---|---|---|---|---|
| Same | Same | Old type | Old type | Deserialize normally |
| Older | Newer | Old type | Null | Ignore discarded data member |
| Newer | Older | Null | Old type | Insert default data for null data member |
| Newer | Newer | Null | Null | Ignore null data member |

FIG. 6   Null data type substituted for discarded data member

| Serializer version | Deserializer version | Serialized data type | Expected data type | Deserializer action |
|---|---|---|---|---|
| Same | Same | Old type | Old type | Deserialize normally |
| Older | Newer | Old type | New type | Convert data type; error on data overflow |
| Newer | Older | New type | Old type | Convert data type; error on data overflow |
| Newer | Newer | New type | New type | Deserialize normally |

FIG. 7 Data type changed

| Serializer version | Deserializer version | Serialized data type | Expected data type | Deserializer action |
|---|---|---|---|---|
| Older | Older | - | - | Deserialize normally |
| Older | Newer | - | New type | Substitute default data for missing member |
| Newer | Older | New type | - | Ignore unexpected member |
| Newer | Newer | New type | New type | Deserialize normally |

FIG. 8  New member added at end of serial data stream

VERSION-ADAPTIVE SERIALIZATION AND DESERIALIZATION

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to techniques for serializing and deserializing program objects in object-oriented computer programming.

2. Description of the Related Art

In applications implemented by objected-oriented programming, elements of the application may be represented by programming structures known as program objects. Each object may be an instance of a class that defines the structure of the object. Each class may be comprised of program instructions, data structures, or a combination of program instructions and data structures. The program instructions and data structures comprising an object or a class will be referred to herein as "members". An object that contains only data members without instructions is also known as a "structure." Within this description, the term "object" is intended to describe both objects and structures.

Program objects normally do not survive beyond the execution lifetime of the program that creates them. The information that represents the objects normally resides in some form of volatile storage such as random access memory (RAM) and the ability to access and use this information normally exists only while the program that created the program objects is executing. In order for an object to persist beyond the execution lifetime of the program that creates it, the object may be converted into a serial data stream for writing to a nonvolatile memory device such as a magnetic disc. A similar conversion to a serial data stream may be required if the object to be transmitted from one computer to another computer, for example, within a network.

As used herein, the term "object serialization" refers to the process of generating a serial data stream that represents a program object and the term "object deserialization" refers to the process of reading the serial data stream and recreating the program object.

DETAILED DESCRIPTION

Throughout this description, the embodiments and examples shown should be considered as exemplars, rather than limitations on the apparatus and methods disclosed or claimed.

Description of Apparatus

Figure 1:
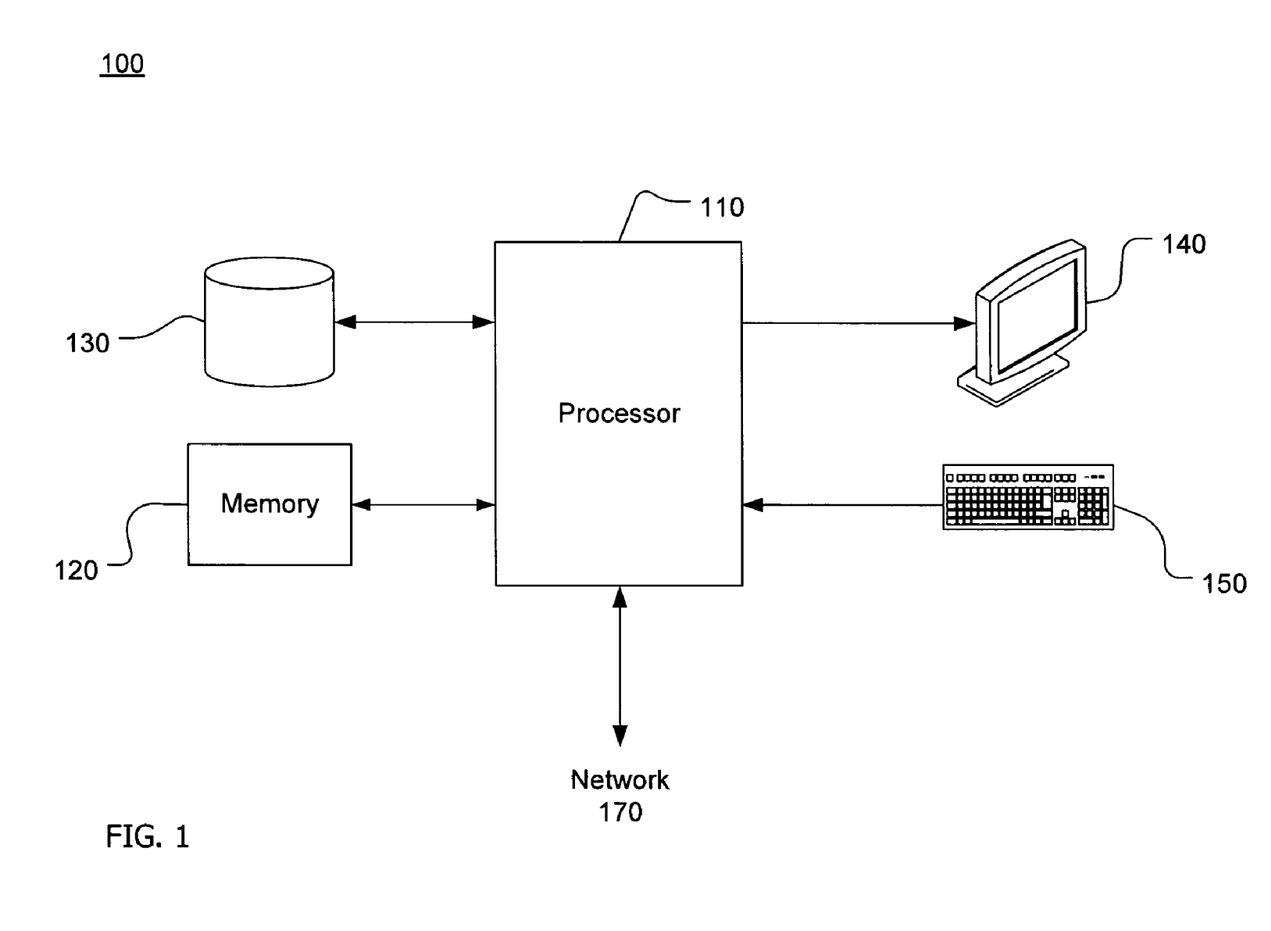
FIG. 1 is a block diagram of a computing device.

Refer now to FIG. 1, which shows a block diagram of a computing device 100. A computing device as used herein refers to any device with a processor 110, memory 120 and a storage device 130 that may execute instructions including, but not limited to, personal computers, server computers, computing tablets, set top boxes, video game systems, personal video recorders, telephones, personal digital assistants (PDAs), portable computers, and laptop computers. The computing device 100 may also include or be coupled with at least one input device 150 and an output device 140. Computing device 100 may also include an interface to a network 170.

The computing device 100 may run an operating system, including, for example, variations of the Linux, Unix, MS-DOS, Microsoft Windows, Palm OS, Solaris, Symbian, and Apple Mac OS X operating systems. The computing device 100 may run one or more application programs. The application programs may include one or more programs written in an object-oriented programming language that may need to serialize or deserialize objects using the methods described herein. The application programs may be written in C++, Smalltalk, or another object-oriented programming language. The application programs may be written in C or another non-object-oriented programming language. The application programs may need to serialize objects in preparation for storing the objects on storage device 130. The application programs may need to deserialize objects retrieved from the storage device 130. The application programs may need to serialize or deserialize objects transmitted or received over the network 170. The application programs may need to serialize or deserialize objects between processes within the computing device 100.

The one or more application programs may be defined by instructions stored on a computer-readable storage media in a storage device included with or otherwise coupled or attached to the computing device 100. These storage media include, for example, magnetic media such as hard disks, floppy disks and tape; optical media such as compact disks (CD-ROM and CD-RW) and digital versatile disks (DVD and DVD±RW); flash memory cards; and other storage media. As used herein, a storage device is a device that allows for reading and/or writing to a storage medium. Storage devices include hard disk drives, CD drives, DVD drives, flash memory devices, and others. The instructions stored on the computer-readable storage media may include instructions that cause the computing device to serialize or deserialize objects.

Figure 2:
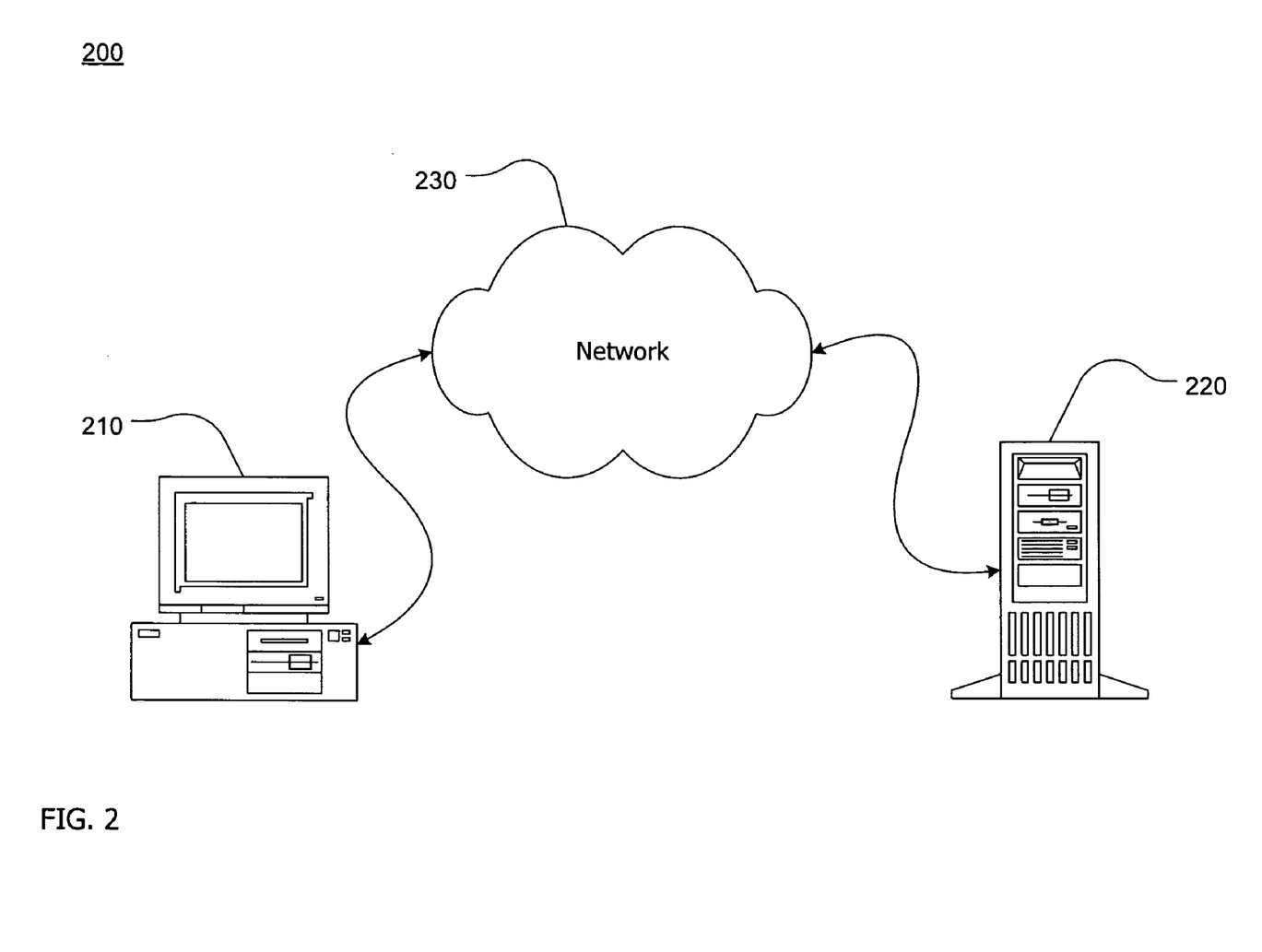
FIG. 2 is a block diagram of a computer network.

FIG. 2 shows a block diagram of a exemplary computer network including a first network capable device 210 and a second network capable device 220 interconnected by a network 230.

The network 230 may be a local area network (LAN), a wide area network (WAN), a storage area network (SAN), or a combination of these. The network 230 may be wired, wireless, or a combination of these. The network 230 may include or be the Internet. The network 230 may be public or private, may be a segregated test network, may be data unit switched or circuit switched, and may be a combination of these. The network 230 may be comprised of a single or numerous nodes providing numerous physical and logical paths for data units to travel.

In the example of FIG. 2, the first network capable device 210 is shown as a personal computer, which may the computing device 100 of FIG. 1, and the second network capable device 220 is shown as a server. It must be understood that the first and second network capable devices 210, 220 may be any devices capable of communicating over the network 230 and/or listening to, injecting, delaying, dropping, and/or modifying network traffic on network 230. The network capable devices 210, 220 may be computing devices such as computer workstations, personal computers, servers, portable computers, set-top boxes, video game systems, personal video recorders, telephones, personal digital assistants (PDAs), computing tablets, and the like; peripheral devices such as printers, scanners, facsimile machines and the like; network capable storage devices including disk drives such as network attached storage (NAS) and storage area network (SAN) devices; testing equipment such as analyzing devices, network conformance systems, emulation systems, network monitoring devices, and network traffic generators; and networking devices such as routers, relays, firewalls, hubs, switches, bridges, traffic accelerators, and multiplexers.

Description of Processes

Figure 3:
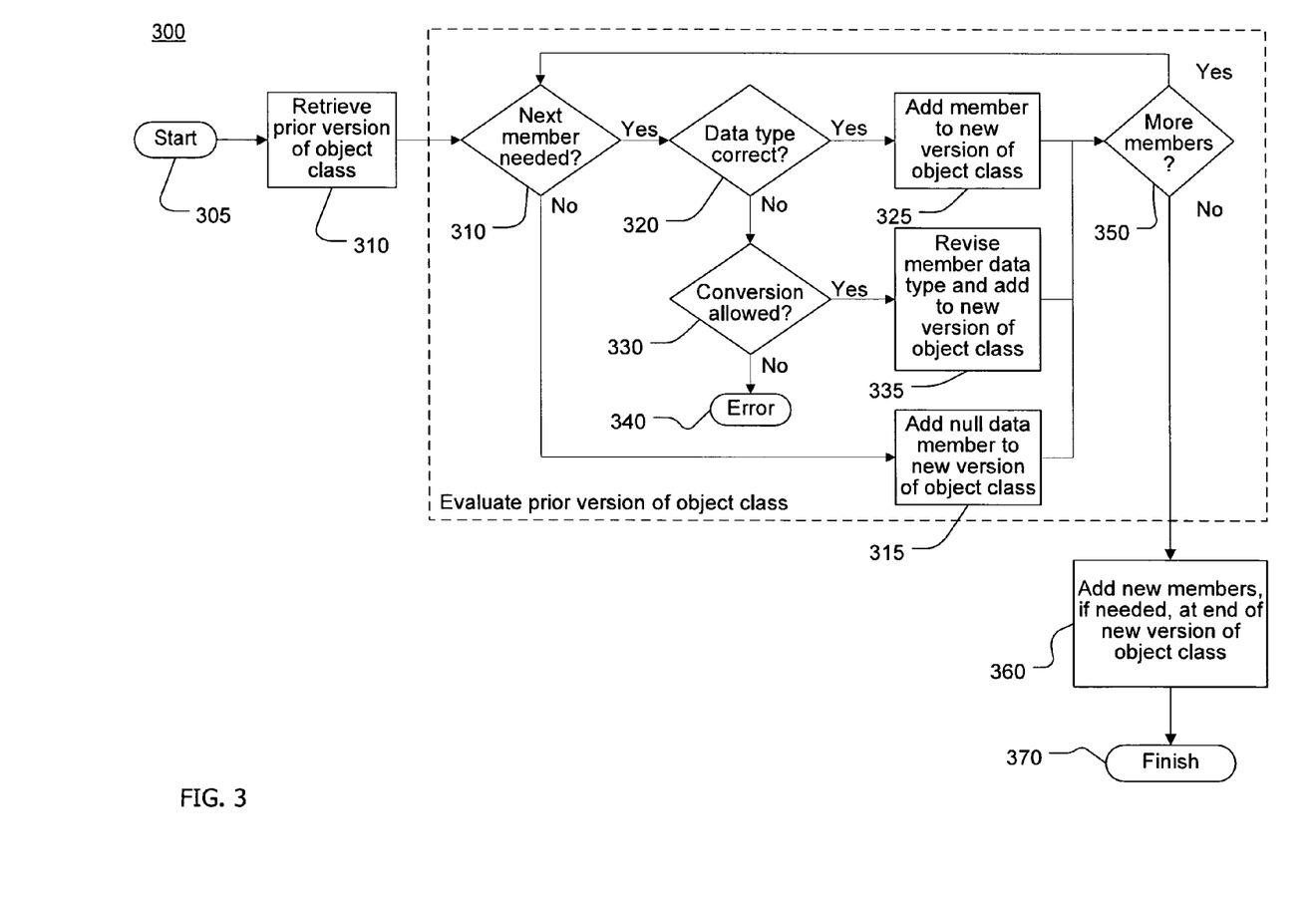
FIG. 3 is a flow chart of a method for revising a class.

Referring now to FIG. 3, a flow chart of a process 300 for revising a class is shown. Although the process 300 has both a start 305 and an end 370, it must be understood that the process 300 may be repeated for every class being revised.

At 310, the current version of the class may be retrieved. From 310 to 350 (operations within the dashed rectangle) each member of the current version of the class may be evaluated. The steps from 310 to 350 may be performed for each member or selected members of the current class in sequence.

The process 300 may accommodate three general types of changes between the revised version of the class and the prior version of the class. First, the process 300 may accommodate revisions that effectively delete one or more members that are present in the prior version of the class but no longer required in the new version of the class. Second, the process 300 may accommodate revisions that change the data type of one or more members within limits on the allowable data type conversions. Third, the process 300 may accommodate revisions that add one or more new members to the new version of the class.

At 310, a determination may be made if the member under consideration is still required in the new version of the class. If the member is obsolete or not required, a null data member may be added to the new version of the class definition at 315. Note that the obsolete data member may not be simply skipped or deleted. Rather a null data type may be inserted in the new version of the class as a place holder to maintain backward compatibility such that a data stream serialized using the new version of the class may be deserialized using a prior version of the class.

Figure 4:
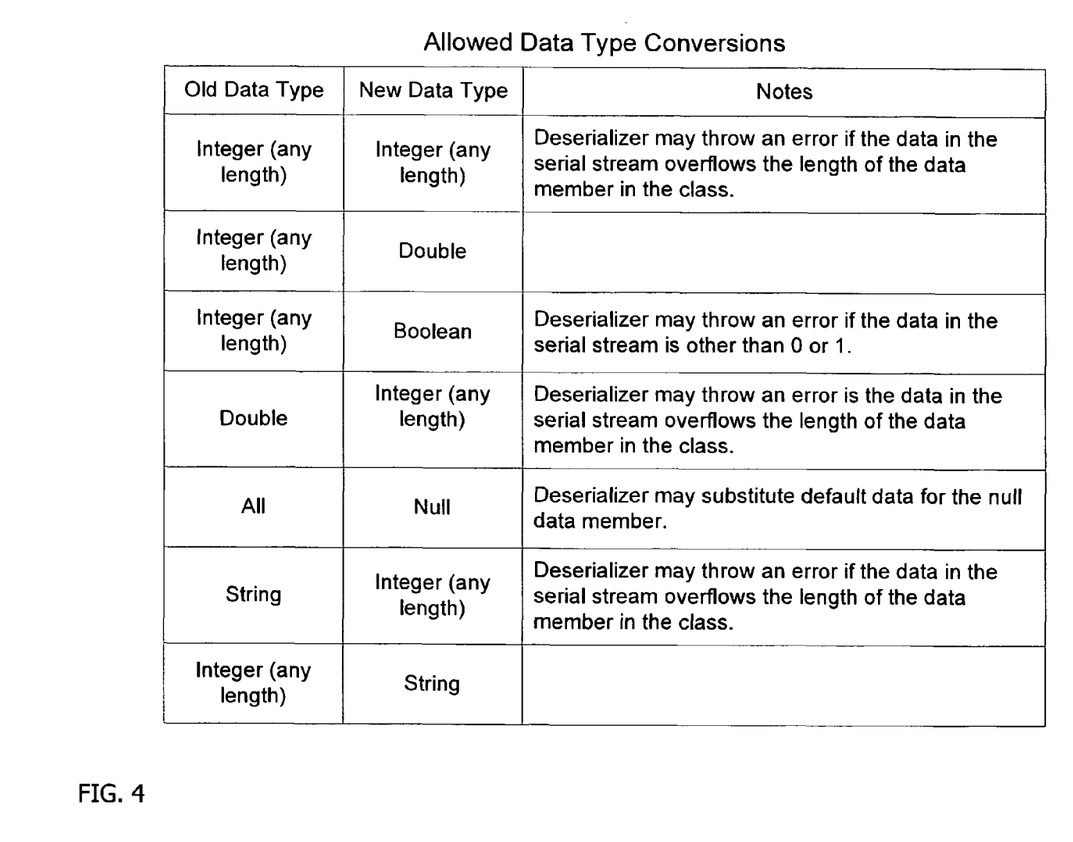
FIG. 4 is an exemplary table of allowable data type conversions.

If the member under consideration is required in the new version of the class, a determination may be made at 320 if the data type of the member in the old version of the class is correct for the new version of the class. If the data type is correct, the member may be added to the new version of the class at 325. If the data type has changed between the new version and old version of the class, a determination may be made at 330 if the new data type is an allowable conversion of the old data type. This determination may be made by consulting a predetermined table of allowable data type conversions. FIG. 4 is an example of a table of allowable data type conversions:

If the conversion is allowed, the member (with the new data type) may be added to the new version of the class at 335. If the conversion is not allowed, an error may be generated at 340. In this event, the new object may have to be defined as a new class, rather than a new version of an existing class.

At 350, a determination may be made if there are more members to consider in the prior version of the class. When all members in the prior version of the class have been considered, the new version of the class may have the same number of members, in the same order, as the old version of the class. However, some of the members in the new class may be null data members. In addition, some members may have different data types converted from the data type of the corresponding members in the prior version of the class.

At 360, any new members (not found in the prior version of the class) may be added at the end of the new version of the class. The process 300 may conclude at 370 after all new members of the class have been added.

Figure 5:
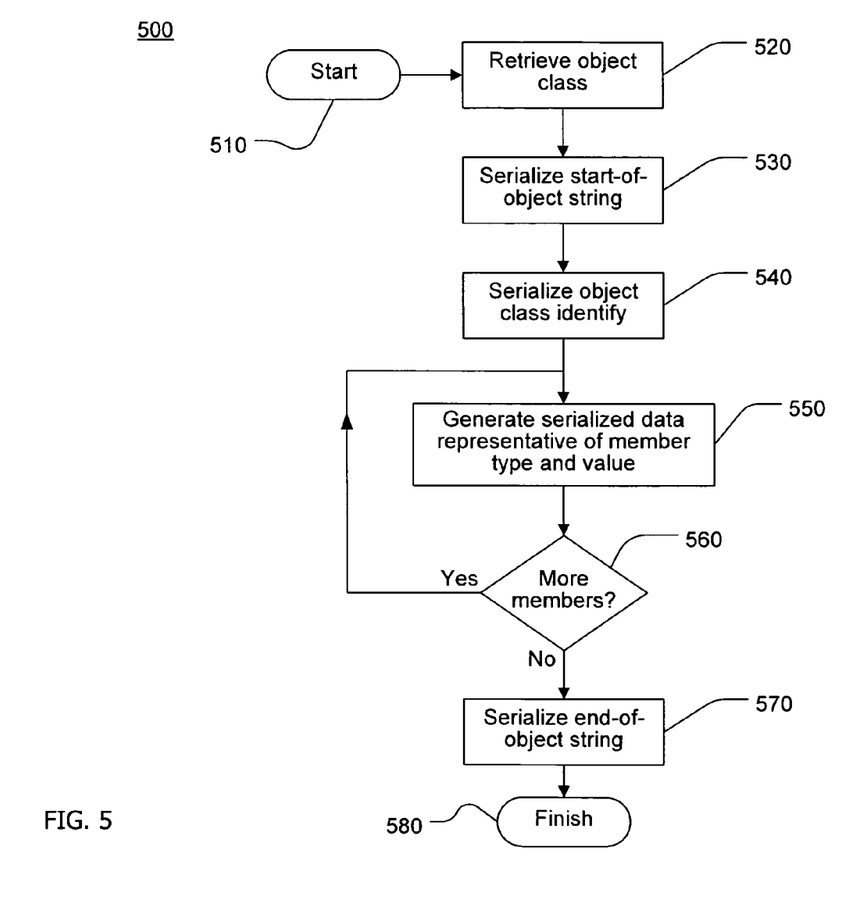
FIG. 5 flow chart of a method for serializing an object.

Referring now to FIG. 5, a flow chart of a process 500 for serializing an object is shown. Although the process 500 has both a start 510 and an end 580, it must be understood that the process 500 may be repeated for every object or selected objects being serialized.

At 520, the current version of the class instantiated by the object may be retrieved. The class defines the members of the object and the method and sequence in which the members are serialized and deserialized. At 530, a start-of-object string may be serialized. Following the start-of-object string, data identifying the class type may be serialized at 540. Note that it may not always necessary to serialize data explicitly identifying the class of an object. For example, if an object of class A is known to contain an object of class B, class B is implicitly identified and it may not be necessary to serialize data explicitly identifying class B.

At 550, serialized data representing the first member data type and value may be generated. In some cases, a single byte may be used to represent both the data type and value. For example, the first seven bits may define the data type as a boolean variable, and the eighth bit may be the value. In other cases, a single byte defining a data type may be followed by one or more bytes containing the data value. For example, a byte defining the data type as a 32-bit integer may be followed by four bytes containing the data value. In other cases, a variable length data type such as a string may be serialized as a byte defining the data type, one or more bytes defining the length of the data, and the defined number of data bytes. Other serialization techniques may be used for these and other data types.

At 560, a determination may be made if the object contains additional members. The steps 550 and 560 are repeated cyclically until all members have been serialized. An end-of-object string is serialized at 570 following the final member. The process 500 for serializing an object may end at 580.

Figure 6:
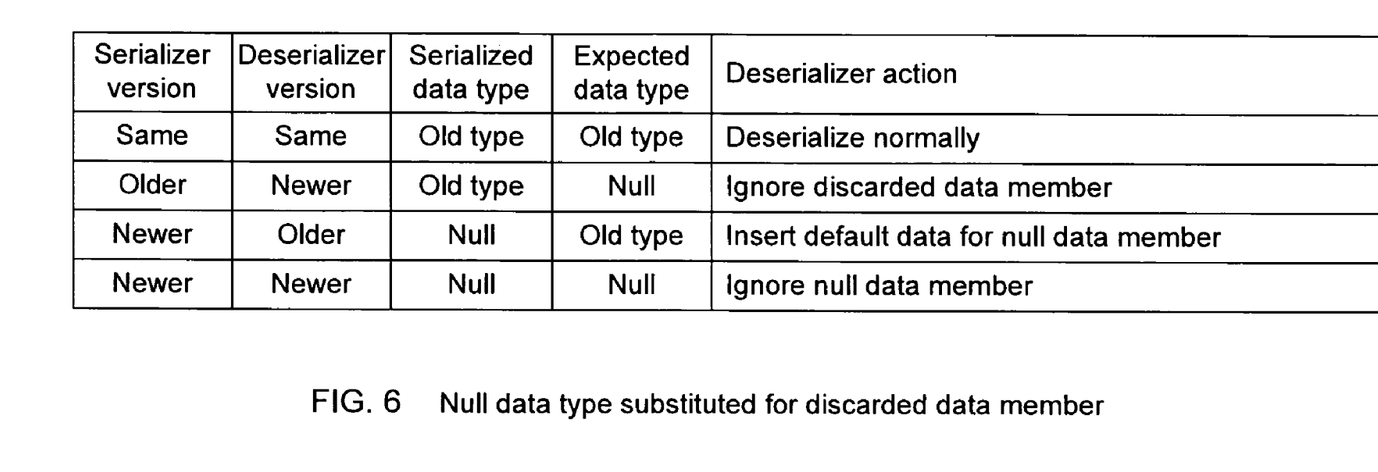
FIG. 6 is a table defining actions taken by a deserializer.
Figure 7:
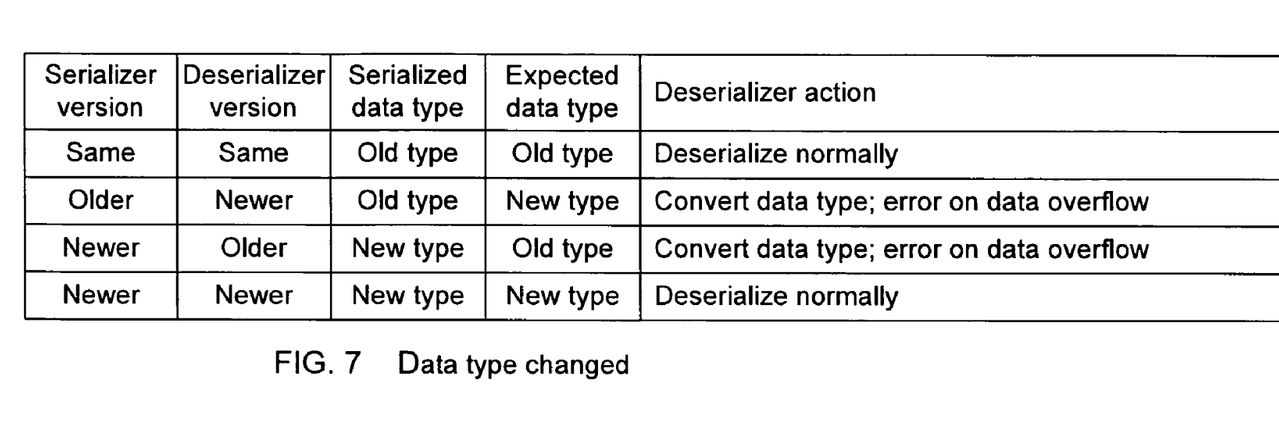
FIG. 7 is a table defining actions taken by a deserializer.
Figure 8:
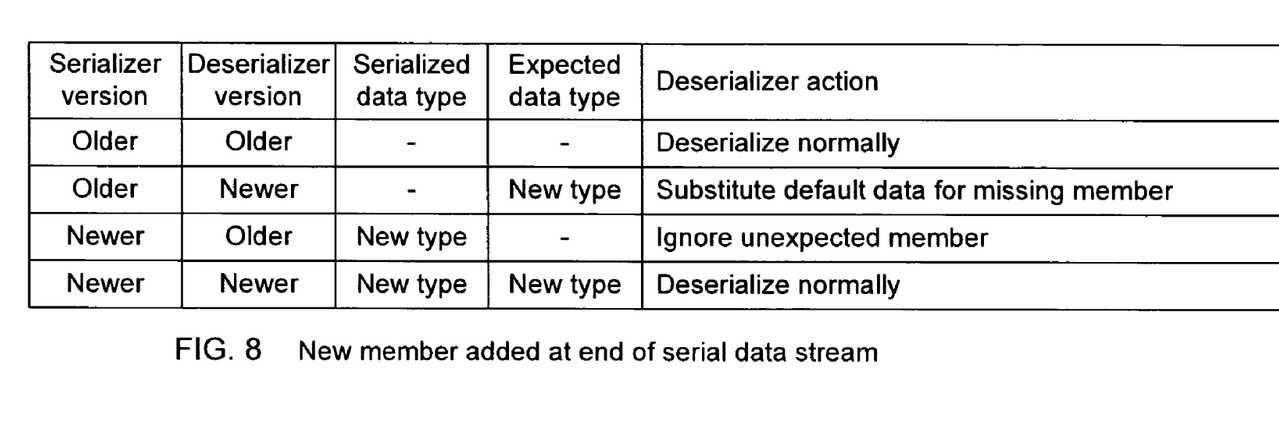
FIG. 8 is a table defining actions taken by a deserializer.

If classes are revised using a process such as the process 300 and are serialized using a process such as process 500, a limited degree of both backward and forward compatibility may be maintained between serialized versions of objects. FIG. 6, FIG. 7, and FIG. 8 show examples of the actions that may be taken when deserializing an object based on a certain version of the class when the data stream representing the object was serialized using the same version of the class, a prior version of the class, or a later version of the class.

FIG. 6 lists the actions that may be taken when a member included in the older version of the class has been replaced by a null data member in the newer version of the class. In the case where the deserializion process uses the newer version of the class, the deserialization process may simply ignore the obsolete member. In the case where the deserialization process uses the older version of the class, the deserialization process may substitute default data, which may be incorporated into the class definition, for the null data member.

FIG. 7 lists the actions that may be taken when the newer version of the class includes a data member having a different data type than the corresponding member in the older version of the class. In this case, the deserialization process may convert the data type to the data type included in the class version being used for deserialization. The deserialization process may declare an error if the data included in the serialized stream overflows the data type. For example, if the class version being used for deserialization defines an signed 8-bit integer data type and the serial stream includes a 16-bit integer data type with a value of 56, the data type is simply converted during deserialization. However, if the serial stream includes a 16-bit integer data type with a value of 200, an error must be declared since the data value exceeds the range (−128 to +127) of the signed 8-bit integer data type.

FIG. 8 lists the actions that may be taken when the newer version of the class includes one or more members, added at the end of the serialized stream, that were not included in the older version of the class. In the case where the deserializion process uses the newer version of the class, the deserialization process may substitute default data for the missing data members. In the case where the deserialization process uses the older version of the class, the deserialization process may simply ignore the extra data members.

Figure 9:
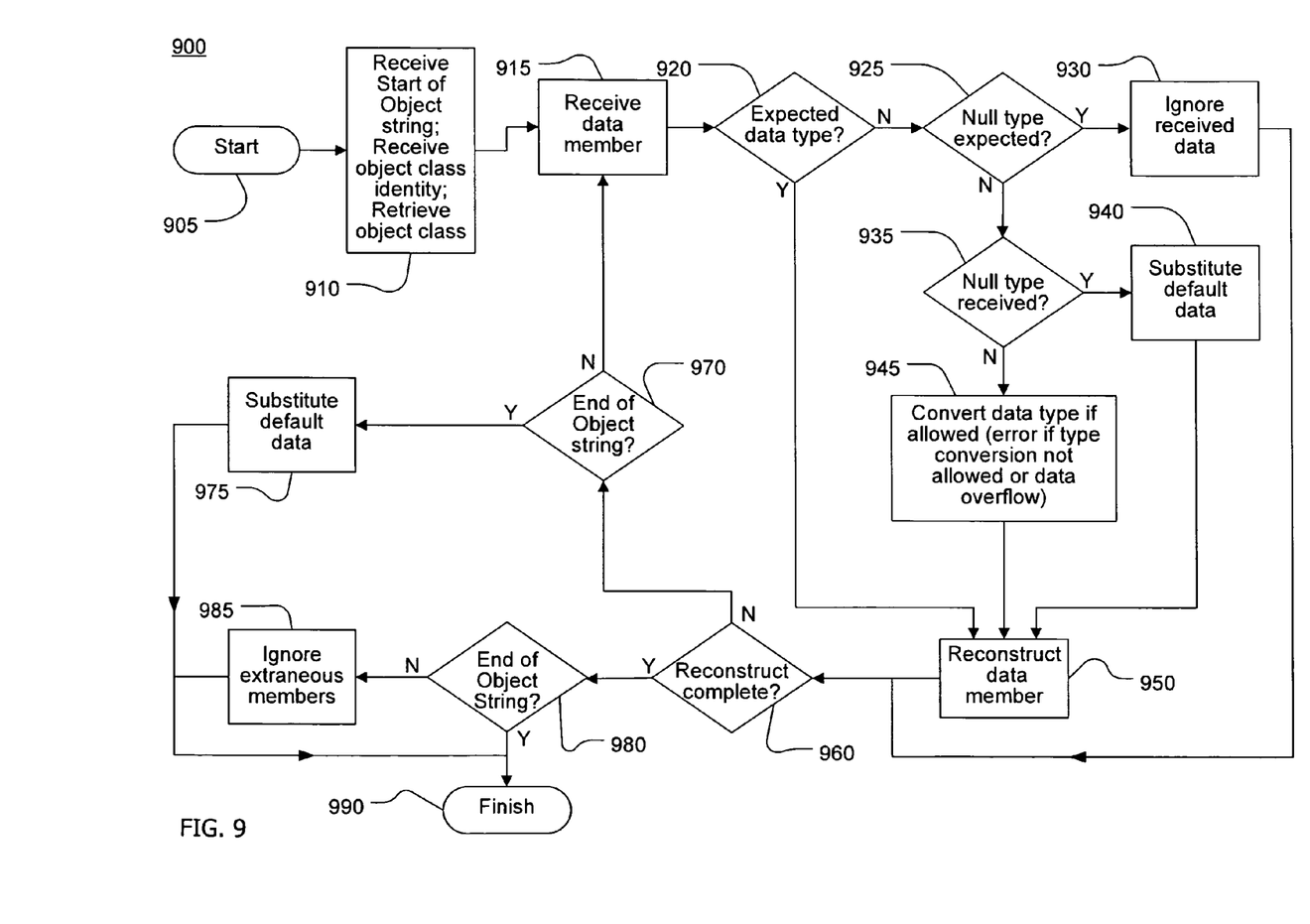
FIG. 9 is a flow chart of a method for deserializing an object.

FIG. 9 is a flow chart of an exemplary process 900 for deserializing an object. The process 900 may provide upward and downward compatibility when a serialization process such as process 500 is used to serialize objects belonging to classes revised using a revision process such as process 300. It must be recognized that the process 900 is an example of a deserialization process that may provide upward and downward compatibility. The elements of the process 900 may be reordered and combined with other elements to provide numerous other process sequences that may be upward and downward compatible with the processes 300 and 500.

Although the process 900 is illustrated having a start 905 and a finish 990, it should be recognized that the process 900 may be repeated for every object in a serialized data stream.

At 910, a start of object string may be received, followed by data identifying an class. The identified class may then process may then be retrieved from memory or storage. The retrieved class may be the same version, an earlier version, or a later version than the class that was used to serialize the object.

At 915, a first data member may be received or, more correctly, data representing the first data member may be received. The data representing the first data member may include a data type followed, in most cases, by data. At 920, the received data type may be compared to the expected data type per the retrieved class. If the received data type is the expected data type, the first data member may be reconstructed at 950. If the received data type is not the expected data type, the class being used to serialize the object may be different from the class that was used to serialize the object.

At 925, a determination may be made if the expected data type is the null data type, in which case the received data member may be ignored at 930 and the process may proceed to 960. If the determination made at 925 is that the expected data type is not the null data type, a second determination may be made at 935 if the received data type is, unexpectedly, the null data type. In this case, default data (which may be included in the class definition) may be substituted at 940 and the data member may be reconstructed at 950.

If the received and expected data types do not match and neither the received or expected data type is the null data type, the received data type and the accompanying data may be converted to the expected data type at 945, if the required conversion is allowed. A table of allowed data type conversions, such as the example of FIG. 4, may be consulted at 945 to determine if the required conversion is allowed. If the conversion of the received data type into the expected data type is allowed, the data member may be reconstructed at 950. If the conversion of the received data type into the expected data type is not allowed, an error may be declared at 945.

After a data member is reconstructed at 950 (or after an unexpected data member is ignored at 930), a determination may be made at 960 if the reconstruction of all members included in the retrieved version of the class have been completed. If the reconstruction of all members of the class is not complete, a determination may be made at 970 if the serial data received immediately after the most recent member is an end of object string. If an end of object string has not been received, the process may repeat steps 915 to 970 cyclically until the object reconstruction is complete or an end of object string is received.

If a determination has been made at 960 that the object has been completely reconstructed, the process may continue until an end of object string is received at 980. At 985, the process 900 may ignore any members or other data received after the object reconstruction is determined to be complete at 960 and before the end of object string.

If a determination has been made at 960 that the object reconstruction is not complete, but an end of object string is received at 970, default data may be substituted for any missing members at 975.

Figure 10:
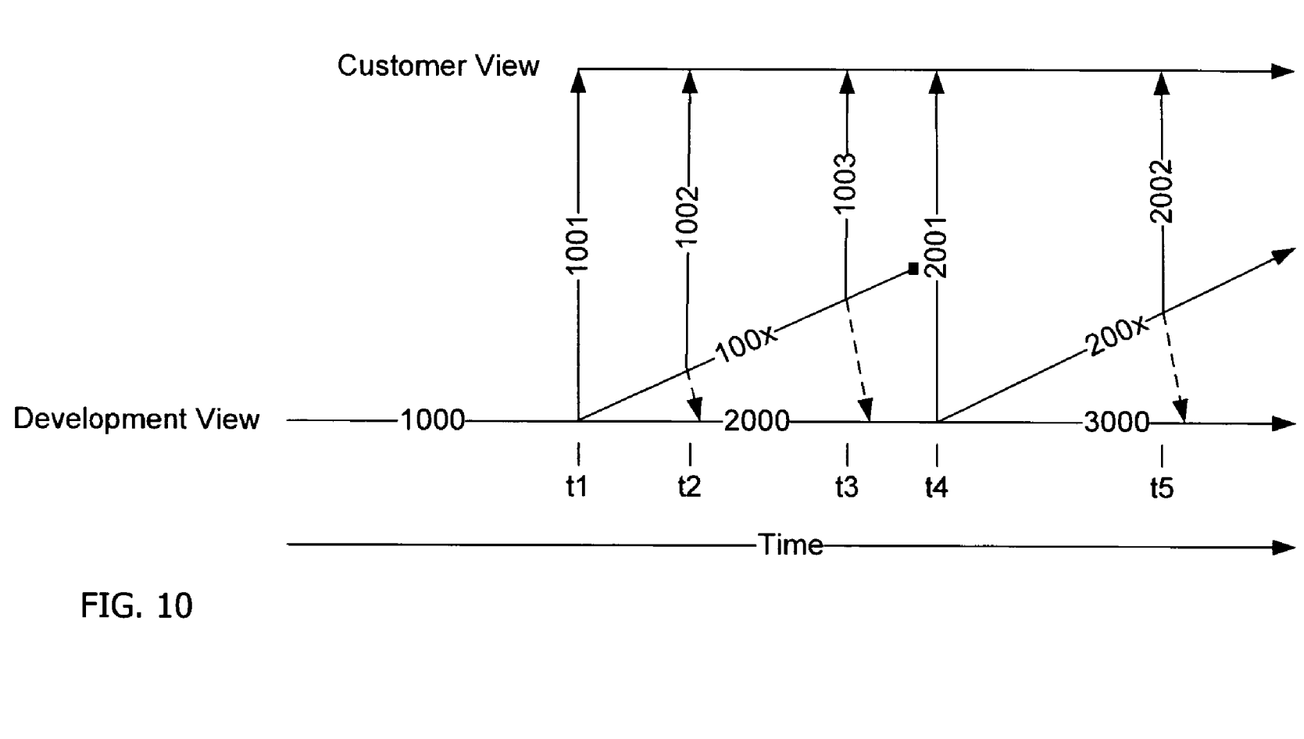
FIG. 10 is a schematic diagram of a method for releasing software versions.

FIG. 10 is a schematic representation of a process for releasing software versions, wherein the successive software versions include classes that have been revised using a process such as process 300. In FIG. 10, the lower horizontal line represents the major software versions visible to the software developer, and the upper horizontal line represents the software versions visible to the customer community. Prior to time t1, the developer may be developing the first generation of a software program, which is labeled 1000. It should be understood that the label 1000 is arbitrary, and various software companies may describe the first version of a program with other labels such as version 1, 1.0, 1.00, 1.0.0, and other labels. At time t1, a first version of the software 1001 may be released to customers.

After time t1, the software developer may be developing incremental upgrades and corrections to the first version of the software as shown by line 100x, and may also begin concurrently developing the second generation of the software as indicated by line 2000. At time t2, a upgrade 1002 to the first generation may be released to the customer community. Concurrent, or nearly concurrent, with the release of version 1002, all of the changes made to classes between version 1001 and 1002 may be incorporated into the second generation program 2000 (as indicated by the dashed arrow), which is still in development. Similarly, at time t3, another version 1003 may be released to the customer community and all of the changes made to classes incorporated in version 1003 may be concurrently incorporated into the second generation program 2000, as indicated by the dashed arrow.

At time t4, the first version of the second generation software 2001 may be released to the customer. The software version 2001 may be upward and downward compatible with any of the released versions of the first generation software (1001, 1002, 1003) at least with respect to serializing and deserializing objects. To ensure continued upward and downward compatibility for serialization and deserialization, the development of the first generation software may be terminated at or before time t4, as indicated by the termination of the line 100x. After time t4, the software developer may continue to develop upgrades to the second generation software, such as version 2002 released at time t5, and may start to develop a third generation software as indicated by line 3000.

CLOSING COMMENTS

The foregoing is merely illustrative and not limiting, having been presented by way of example only. Although examples have been shown and described, it will be apparent to those having ordinary skill in the art that changes, modifications, and/or alterations may be made.

Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A method for deserializing a program object comprised of one or more data members, the method comprising:
   receiving serialized data conveying a representation of the program object, the serialized data including
      data identifying a class of the program object, and
      a data type and at least one data value for each of the one or more data members comprising the program object;
   retrieving a class definition for the identified class, the class definition including an expected data type for each data member; and
   reconstructing the program object according to the class definition, wherein reconstructing the program object comprises, for each data member:
      reconstructing the data member if the received data type is an expected data type according to the class definition,
      ignoring the data member if the expected data type according to the class definition is a null data type,
      substituting one or more default data values if the received data type is the null data type and the expected data type according to the class definition is not a null data type, and
      converting the received data type to the expected data type according to the class definition if the received data type is not the expected data type and neither the received data type or the expected data type is the null data type.

2. The method for deserializing a program object of claim 1, wherein the serialized data conveying a representation of the program object begins with a start-of-object string.

3. The method for deserializing a program object of claim 1, wherein the serialized data conveying a representation of the program object terminates with an end-of-object string.

4. The method for deserializing a program object of claim 3, wherein reconstructing the program object according to the class definition further comprises:
   upon receipt of an end-of-object string, determining if all data members required to reconstruct the program object according to the class definition have been received; and
   if all data members required to reconstruct the program object according to the class definition have not been received, substituting default values for any data members that have not been received.

5. The method for deserializing a program object of claim 3, wherein reconstructing the program object according to the class definition further comprises:
   upon reconstructing each data member, determining if all data members required to reconstruct the program object according to the identified class have been received; and
   if all data members required to reconstruct of the program object according to the identified class have been received, ignoring any further data received prior to the end-of-object string.

6. A non-transitory storage medium having instructions stored thereon which when executed by a processor will cause the processor to execute a method for deserializing a program object comprised of one or more data members, the method comprising:
   receiving serialized data conveying a representation of the program object, the serialized data including
      data identifying a class of the program object, and
      a data type and at least one data value for each of the one or more data members comprising the program object;
   retrieving a class definition for the identified class, the class definition including an expected data type for each data member; and
   reconstructing the program object according to the class definition, wherein reconstructing the program object comprises, for each data member:
      reconstructing the data member if the received data type is an expected data type according to the class definition,
      ignoring the data member if the expected data type according to the class definition is a null data type, substituting one or more default data values if the received data type is the null data type and the expected data type according to the class definition is not a null data type, and converting the received data type to the expected data type according to the class definition if the received data is not the expected data type and neither the received data type or the expected data type is the null data type.

7. The non-transitory storage medium of claim 6, wherein the serialized data conveying a representation of the program object begins with a start-of-object string.

8. The non-transitory storage medium of claim 6, wherein the serialized data conveying a representation of the program object terminates with an end-of-object string.

9. The non-transitory storage medium of claim 8, wherein reconstructing the program object according to the class definition further comprises:

upon receipt of an end-of-object string, determining if all data members required to reconstruct the program object according to the class definition have been received; and if all data members required to reconstruct the program object according to the class definition have not been received, substituting default values for any data members that have not been received.

10. The non-transitory storage medium of claim 8, wherein reconstructing the program object according to the class definition further comprises:

upon reconstructing each data member, determining if all data members required to reconstruct the program object according to the identified class have been received; and if all data members required to reconstruct of the program object according to the identified class have been received, ignoring any further data received prior to the end-of-object string.

11. A computing device to deserialize a program object comprised of one or more data members, the computing device comprising:

a processor;

a memory coupled with the processor; and a storage medium having instructions stored thereon which when executed cause the computing device to perform actions comprising:

receiving serialized data conveying a representation of the program object, the serialized data including data identifying a class of the program object, and a data type and at least one data value for each of the one or more data members comprising the program object;

retrieving a class definition for the identified class, the class definition including an expected data type for each data member; and reconstructing the program object according to the class definition, wherein reconstructing the program object comprises, for each data member:

reconstructing the data member if the received data type is an expected data type according to the class definition, ignoring the data member if the expected data type according to the class definition is a null data type, substituting one or more default data values if the received data type is the null data type and the expected data type according to the class definition is not a null data type, and converting the received data type to the expected data type according to the class definition if the received data type is not the expected data type and neither the received data type or the expected data type is the null data type.

12. The computing device of claim 11, wherein the serialized data conveying a representation of the program object begins with a start-of-object string.

13. The computing device of claim 11, wherein the serialized data conveying a representation of the program object terminates with an end-of-object string.

14. The computing device of claim 13, wherein reconstructing the program object according to the class definition further comprises:

upon receipt of an end-of-object string, determining if all data members required to reconstruct the program object according to the class definition have been received; and if all data members required to reconstruct the program object according to the class definition have not been received, substituting default values for any data members that have not been received.

15. The computing device of claim 13, wherein reconstructing the program object according to the class definition further comprises:

upon reconstructing each data member, determining if all data members required to reconstruct the program object according to the identified class have been received; and if all data members required to reconstruct of the program object according to the identified class have been received, ignoring any further data received prior to the end-of-object string.

* * * * *